United States Patent [19]

Morrin et al.

[11] 3,996,559
[45] Dec. 7, 1976

[54] METHOD AND APPARATUS FOR ACCESSING HORIZONTAL SEQUENCES, VERTICAL SEQUENCES AND REGULARLY SPACED RECTANGULAR SUBARRAYS FROM AN ARRAY STORED IN A MODIFIED WORD ORGANIZED RANDOM ACCESS MEMORY SYSTEM

[75] Inventors: Thomas Harvey Morrin, San Jose; David Curtis Van Voorhis, Los Gatos, both of Calif.

[73] Assignee: International Business Machines Corporation, Armonk, N.Y.

[22] Filed: Nov. 7, 1974

[21] Appl. No.: 521,606

[52] U.S. Cl. .................. 340/146.3 MA; 340/172.5
[51] Int. Cl.$^2$ ...................................... G06F 15/20
[58] Field of Search ............ 340/146.3 MA, 172.5, 340/173 R; 178/DIG. 22, DIG. 34; 444/1

[56] References Cited
UNITED STATES PATENTS

| | | | |
|---|---|---|---|
| 3,492,646 | 1/1970 | Bene et al. .................. | 340/146.3 Q |
| 3,889,234 | 6/1975 | Makihara et al. ......... | 340/146.3 MA |
| 3,899,771 | 8/1975 | Saraga et al. ............. | 340/146.3 MA |
| 3,938,102 | 2/1976 | Morrin et al. ............. | 340/146.3 MA |

OTHER PUBLICATIONS
Lewitan, "N Tables in One," IBM Tech. Disclosure Bulletin, vol. 13, No. 8, Jan. 1971, pp. 2182–2183.

*Primary Examiner*—Leo H. Boudreau
*Attorney, Agent, or Firm*—Otto Schmid, Jr.

[57] ABSTRACT

A conventional word organized random access memory is modified for image processing operations so that the $pq$ image points of any $1 \times pq$ subarray, any $pq \times 1$ subarray, or any regularly-spaced $p \times q$ subarray of an $rp \times sq$ or smaller image array stored in the memory can be extracted or updated in a single memory cycle. The invention contemplates $pq$ memory modules labeled from 0 to pq-1 for storing the image points, each module being capable of storing $rs$ points in distinguishable cells, only one cell of which is randomly accessible in a single instant of time. The invention further contemplates accessing circuitry for causing each image point $I(i,j)$ of an image array to be routed to or from a memory module $M(i,j)$ according to the relation $M(i,j) = [iq+(i/p)//q+j]//pq$, where the notations "/" and "//" denote, respectively, the quotient and the remainder resulting from integer division. The accessing circuitry additionally causes image point $I(i,j)$ to be stored into or retrieved from a cell location $A(i,j)$ of module $M(i,j)$ according to the relation $A(i,j)=(i/p)s+(j/q)$.

6 Claims, 14 Drawing Figures

APPARATUS FOR ACCESSING MODIFIED WORD ORGANIZED RAM

APPARATUS FOR ACCESSING MODIFIED WORD ORGANIZED RAM

|   | j=0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| i=0 | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
|  | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 |
|  | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 |
|  | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B |
| 4 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 |
|  | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 |
|  | 9 | A | B | C | D | (E) | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 |
|  | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C |
| 8 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 |
|  | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 |
|  | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 |
|  | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D |
| 12 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 |
|  | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 |
|  | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A |
|  | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E |
| 16 | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
|  | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 |
|  | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 |
|  | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B |
| 20 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 |
|  | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 |
|  | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 |
|  | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C |
| 24 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 |
|  | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 |
|  | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 |
|  | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D |
| 28 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 | 2 |
|  | 7 | 8 | 9 | A | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 |
|  | B | C | D | E | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A |
|  | F | 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E |

FIG. 2A

|  j=0 | 4 | 8 | 12 | 16 | 20 | 24 | 28 |
|---|---|---|---|---|---|---|---|
| i=0 | | | | | | | |
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 2B

ADDRESS & CONTROL CIRCUITRY

- GLOBAL LOGIC:
  - INPUTS: t; i; j
  - OUTPUTS: R = {t00, i0, y0, u0}; C = {t01, x0, j0, v0}; P = {i2, t01, m}
  - CALCULATIONS:
    - t00 = EQ(t,00)
    - t01 = EQ(t,01)
    - x0 = i/p; i0 = i//p
    - i2 = t01(i//pq)
    - y0 = j/q; j0 = j//q
    - m = ($\overline{t01}$ [i0·q + x0//q] + j//pq)//pq
    - u0 = m/q; v0 = m//q ROW LOGIC
INPUT: $u;\ R = \{t00, i0, y0, u0\}$
OUTPUTS: $t00;\ yu;\ lu2;\ eu3$
CALCULATIONS: $z = (u-u0)//p$
$yu = y0 + t00(z-1)$
$eu1 = EQ(z,0)$
$lu2 = LT(z,i0);\ eu2 = EQ(z,i0)$
$eu3 = t00 \cdot eu1 + \overline{t00} \cdot \overline{eu1}(lu2 + eu2)$

ROW LOGIC

COLUMN LOGIC
INPUTS: $v$; $C = \{t01, x0, j0, v0\}$
OUTPUTS: $t01$; $xv$; $lv1$; $ev1$; $lv2$
CALCULATIONS: $xv = x0 + t01 \, [(v-v0) // q]$
$lv1 = LT(v, v0)$; $ev1 = EQ(v, v0)$
$lv2 = LT([v - \overline{t01}(x0 // q)] // q, j0)$

COLUMN LOGIC

VARIABLE RIGHT ROTATE PERMUTER

RIGHT ROTATE 0/1

SPECIAL PERMUTER S1

INPUTS: $t01; D' = \{d'(0), d'(1), ..., d'(pq-1)\}$

OUTPUTS: $E' = \{e'(0), e'(1), ..., e'(pq-1)\}$

CALCULATIONS: $e'(k) = \overline{t01} \cdot d'(k) + t01 \cdot d'(p[k//q] + k/q), 0 \leq k < pq$

SPECIAL PERMUTER S1

SPECIAL PERMUTER S2

INPUTS: t01; E' = {e'(0), e'(1), ..., e'(pq-1)}
OUTPUTS: D' = {d'(0), d'(1), ..., d'(pq-1)}
CALCULATIONS: $d'(k) = \overline{t01} \cdot e'(k) + t01 \cdot e'(q[k//p] + k/p), 0 \leq k < pq$

SPECIAL PERMUTER S2

METHOD AND APPARATUS FOR ACCESSING HORIZONTAL SEQUENCES, VERTICAL SEQUENCES AND REGULARLY SPACED RECTANGULAR SUBARRAYS FROM AN ARRAY STORED IN A MODIFIED WORD ORGANIZED RANDOM ACCESS MEMORY SYSTEM

BACKGROUND OF THE INVENTION

This invention relates to an access method and apparatus for selectively extracting or updating subarrays of a larger array stored in a modified word organized random access memory, and more particularly, relates to the modifications to a conventional word organized memory used for image processing.

As understood, a digital image is considered to be a twodimensional array of image points, each of which comprises an integer or a set of integers. Image manipulation ideally subsumes the capability of storing an image array in a memory and operating upon selected clusters of points simultaneously, such as sequences of points in a single row or column of the array and points within a small rectangular area. This imposes the constraint that the memory must allow all points in any selected cluster to be accessed in one memory cycle. If any desired combination of points in the array could be accessed simultaneously from a bit addressable memory, then storage and retrieval of clusters of image points would pose no problem. However, because digital images form large arrays, only word organized memories are economically available. A conventional word organized memory includes a plurality of randomly accessible "words" of storage locations, each word of which can store a cluster of image points. However, it is necessary to modify the accessing mechanism of his conventional memory in order to permit access to clusters of image points when the points are not all in the same word of storage.

An image can be represented by an M × N array $I(*,*)$ of image points, where each point $I(i,j)$ for $0 \leq i < M$ and $0 \leq j < N$ is an integer or a set of integers which represents the color and intensity of a portion of the image. For simplicity, attention can be restricted to black/white images for which $I(i,j)$ is a single bit of information. Typically, $I(i,j)=1$ repreesents a black area of the image, and $I(i,j)=0$ represents white area.

Images are most commonly generated by scanning pictorial data such as 8 ½ inches × 14 inch documents. Thereafter, they can be stored, viewed from a display, transmitted, or printed. Since most scanners and printers process an image from top to bottom and from left to right, images are normally transmitted in the standard "row major" sequence: $I(0,0)$, $I(0,1)$, ---, $I(0, N-1)$, $I(1,0)$, ---, $I(M-1, N-1)$. Therefore, a memory system for image processing operations should at least permit simultaneous access to a number of adjacent image points on a single row of $I(*,*)$. This would permit the image or a partial image to be transferred rapidly into and out of the memory system, with many image points in each row being transferred simultaneously.

For many image processing operations, such as character recognition, it is necessary to rotate an image or a partial image by a multiple of 90°. Such rotations are greatly facilitated by a memory system that permits simultaneous access to a number of adjacent points along any row or column of the image array $I(*,*)$. For example, a memory system that permits such accesses can be used as follows to rotate by niety degrees (counterclockwise) an image transmitted in row major sequence: (1) transfer the image into the memory row by row, starting with the uppermost row and storing many image points in each row simultaneously; and then (2) transfer the image out of the memory column by column, starting with the rightmost column and retrieving many image points in each column simultaneously.

It is also desirable to access rectangular blocks of points within am image to accommodate another class of image processing operations, such as block insertion, block extraction, and contour following. For example, it may be desirable to add alphanumeric characters to the image from a stored dictionary, which dictionary includes a predefined bit array for each character. Similarly, it may be desirable to delete or edit characters or other rectangular blocks from an image. Lastly, algorithms for locating the contours of objects in the image involve moving a cursor from one image point to another along a border or boundary of an object. The contour following algorithms require rapid access to an image point and a plurality of its near neighbors, which together constitute a block of image points.

Typically, a word organized random access memory comprises a plurality of memory modules, each module being a storage device with a plurality of randomly accessible storage cells. Although each cell is able pq store an image point which comprises a single bit of information, only one cell in a module can be accessed (read from or stored into) at a time. The accessing mechanism of a conventional word organized random access memory provides a single cell address to all of its constituent memory modules, so that the ith cell in one module can be accessed only in conjunction with the ith cell of all other modules. These cells together comprise the ith word of the memory. A conventional word organized random access memory thus provides access to a cluster of image points only if they are all stored in the same word of the memory. However, a suitable modification of the accessing mechanism for a word organized memory can permit access to any desired cluster of images points, provided each module stores at most one point in the cluster.

As previously stated, a memory system is desired which permits simultaneous access to horizontal sequences, vertical sequences, and rectangular blocks of image points. If the desired horizontal and vertical sequences include $pq$ image points, and if the dimensions of the desired blocks of image points are $p \times q$, then a memory system with at least $pq$ memory modules is required. Furthermore, a method for distributing the image poins of an image array $I(*,*)$ among memory modules must be designed which places the $pq$ elements of each $1 \times pq$, $pq \times 1$, or $p \times q$ subarray of $I(*,*)$ in distinct modules. Relatedly, it is necessary to design addressing circuitry which permits simultaneous access to these subarrays, and which arranges their elements into a convenient order, such as row major order.

Finally, for reasons of economy, it is desirable to limit the number of memory modules in the memory system to the minimum number possible, namely $pq$. However, it can be shown that a memory system with this few memory modules cannot permit access to all $1 \times pq$, $pq \times 1$, and $p \times q$ subarrays of an image array $I(*,*)$, since no distribution of the image points in $I(*,*)$ among $pq$ memory modules places the $pq$ elements of all of these subarrays in distinct memory modules. The present invention discloses a memory modules system with only $pq$ memory that permits access to most of the desired subarrays of $I(*,*)$. Specifically, access is provided to all $1 \times pq$ subarrays, all $pq \times 1$ subarrays, and regularly spaced $p \times q$ subarrays.

SUMMARY OF THE INVENTION

It is accordingly an object of this invention to modify a conventional word organized random access memory for image processing operations so that it is capable of storing an image or partial image therein, and so that it permits access to sequences of image points along any row or column of the image array and to the image points within regularly spaced rectangular areas of this array. Restated, it is an object to modify a conventional word organized random access memory which stores an $rp \times sq$ or smaller image array such that any $pq \times 1$ subarray, any $1 \times pq$ subarray or any regularly spaced $p \times q$ subarray of the image can be accessed (read or written) in a single memory cycle, $p$, $q$, $r$, and $s$ being design parameters.

In the case of the "regularly spaced $p \times q$" subarray of an image array $I(*,*)$ stored in the memory, it is the object that such array be accessible if its upper lefthand element falls on the ith row of $I(*,*)$, where $i$ is a multiple of $p$.

The foregoing objects are believed satisfied by an apparatus for storing black/white images, which apparatus includes a novel accessing arrangement. The apparatus comprises memory means for storing the image points in the cells of $pq$ different memory modules, each module being an entity capable of storing $rs$ image points in distinguishable cells, only one cell of which is randomly accessible at a single instant of time. The apparatus further comprises means for extracting from the memory means horizontal or vertical linear sequences of length $pq$ or rectangular matrices of dimension $p \times q$, the starting point in the array for either sequence being arbitrary, and the starting point for matrices being limited to regularly spaced rows. Relatedly, the apparatus also comprises means for arranging the elements of the sequences or blocks accessed into row major order.

Restated, the disclosed apparatus includes $pq$ memory modules labeled $0, 1, ..., pq-1$, which modules can together store an $rp \times sq$ image array consisting of image points $I(i,j)$, where $i$ lies on the range $0 \leq i<rp$ and $j$ lies on the range $0 \leq j<sq$. Secondly, the disclosed apparatus includes routing means which causes the image point $I(i,j)$ to be routed to or from memory module $M(i,j)=[iq+(i/p)//q+j]//pq$, where the notations "/" and "//" denote, respectively, the quotient and the remainder resulting from integer division. Thirdly, the disclosed apparatus includes address calculation means which, in conjunction with the routing means, causes image point $I(i,j)$ to be stored into or retrieved from location $A(i,j)=(i/p)s+(j/q)$ of memory module $M(i,j)$. Lastly, the disclosed apparatus includes control means which achieves simultaneous storage of retrieval of the $pq$ image points in any $1 \times pq$ subarray, any $pq \times 1$ subarray, or any regularly spaced $p \times q$ subarray of the image array.

BRIEF DESCRIPTION OF THE DRAWINGS

FIGS. 2A and 2B illustrate the module assignment and the address assignment for the case that $p=q=4$ and $r=s=8$.

Description of the Preferred Embodiment

Figure 1:
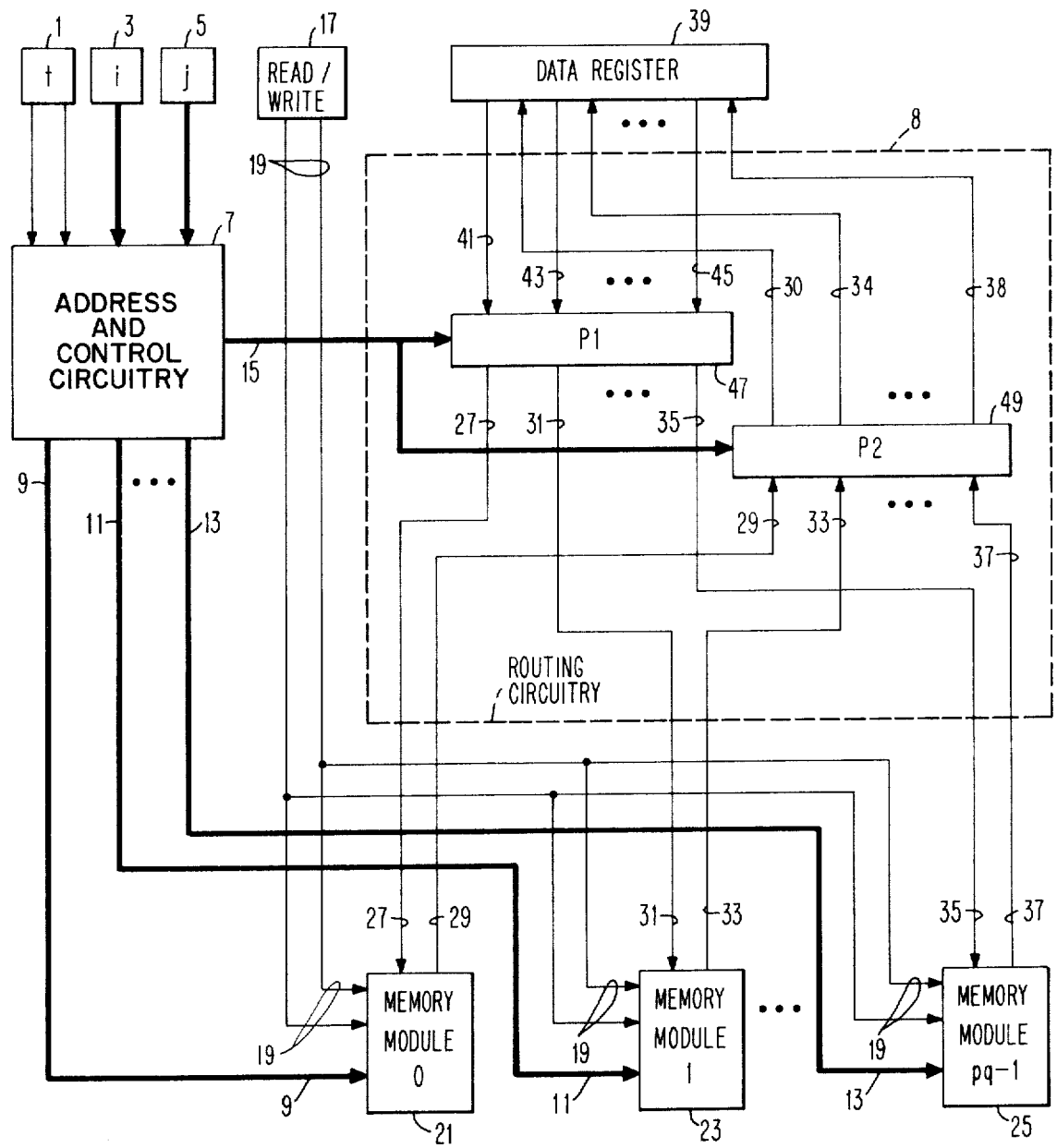
FIG. 1 shows the architecture of a word organized memory modified according to the invention.

Referring now to FIG. 1, there is shown the architecture for the modified word organized random access memory. The apparatus inclues $pq$ memory modules 21, 23, 25. Each module is able to store $rs$ image points. This means that each module stores $rs$ bits of information. Address and control circuitry 7 prmits these modules to store any $rp \times sq$ (or smaller) image array $I(*,*)$, and to access any $1 \times pq$ subarray, any $pq \times 1$ subarray, or any regularly spaced $p \times q$ subarray of $I(*,*)$. A data register 39 is provided to hold any of these $pq$ element subarrays prior to storage or following retrieval of the image information from the memory modules. Also included are permuters 47 and 49. Permuters generally are specialized circuits for rearranging data. In the context of this invention, the permuters 47 and 49, respectively, route elements of the subarrays to and from the appropriate memory modules for storage and retrieval. Control of the permuters is resident in the address and control circuitry 7 and connectable thereto over path 15.

When a particular subarray is to be stored in the memory system, the contents of registers 1, 3, and 5 are used to determine the subarray shape and the coordinates $(i,j)$ of the upper lefthand corner of the array as a reference point or base address. Thus, the two bit $t$ register 1 is set to one of the values $t=00$, $t=01$, or $T=10$ in order to indicate whether the subarray shape is $1 \times pq$, $pq \times 1$, or $p \times q$. The $i$ and $j$ registers 3 and 5 are set to indicate coordinates of the upper lefthand element $I(i,j)$ of the subarray. The subarray itself is placed in data register 39 in row major order, such that $I(i,j)$ is in the leftmost position of the register. The subarray elements are provided to permuter 47 via lines 41, 43, and 45. Based upon the values of $t$, $i$ and $j$, the control portion of address and control circuitry 7 causes permuter 47 to route each element of the subarray over counterpart lines 27, 31, and 35 to the module within which it is to be stored. The address portion of address and control circuitry 7 calculates its location within that module. The addresses are provided to the modules by lines 9, 11, and 13. Finally, a write signal provided on lines 19 from an external read/write control source 17 causes the $pq$ elements of the subarray to be stored simultaneously in the different memory modules.

When a particular subarray is to be retrieved from the memory system, the $t$, $i$, and $j$ registers are set as described above so as to indicate the shape of the subarray and to identify its upper lefthand element. The address portion of the address and control circuitry 7 uses the values of $t$, $i$, and $j$ in order to calculate for each memory module the location of the unique element of the subarray which it contains. After the calculations are made, a read signal from 17 on lines 19 causes the $pq$ elements of the subarray to be retrieved from the modules and routed via lines 29, 33, and 37 to permuter 49. The control portion of the address and control circuitry 7 causes permuter 49 to arrange the elements of the subarray in row major order and to route them to data register 39 over lines 30, 34, and 38.

Whenever a $1 \times pq$, $pq \times 1$, or $p \times q$ subarray of $I(*,*)$ is retrieved from or stored into the memory system, the address portion of the address and control circuitry 7 must calculate, for $0 \leq k < pq$, the location $l(i,j,k,t)$ of the unique element $e(i,j,k,t)$ of the subarray either contained by or to be placed in the kth memory module. The control portion of the address and control circuitry 7 must, in combination with permuters 47 and 49, arrange for element $e(i,j,k,t)$ to be routed to or from the appropriate position in register 39. Table 1 summarizes the address calculations and routing patterns required for access to a subarray whose upper lefthand element is image point $I(i,j)$. The routing pattern specification indicates which of the $pq$ positions $d(0), d(1), \ldots, d(pq-1)$ of data register 39 is to receive or supply element $e(i,j,k,t)$.

$0 \leq j < sq$, the value of $M(i,j)$ lies in the range $0 \leq M(i,j) < pq$. Each image point $I(i,j)$ is then stored in the $M(i,j)$th memory module.

If the memory system outlined in FIG. 1 is to store the image array $I(*,*)$ in a manner permitting simultaneous access to the $pq$ image points in any $1 \times pq$ subarray of $I(*,*)$, then these image points must be stored in different memory modules. This is because only one storage cell of each memory module is randomly accessible at a single instant of time. Similarly, if the memory system in FIG. 1 is to permit simultaneous access to the $pq$ image points in any $pq \times 1$ subarray of $I(*,*)$, or in any regularly spaced $p \times q$ subarray of $I(*,*)$, then these image points must also be stored in different memory modules.

It was unexpectedly observed that if the module as-

TABLE 1

| Subarray Shape | t | Address Calculation | Routing Pattern |
|---|---|---|---|
| $1 \times pq$ | 00 | $M(i,j) = [iq + (i/p)//q + j]//pq$<br>$g(i,j,k,t) = [k - M(i,j)]//pq$;<br>$b = g(i,j,k,t)$;<br>$l(i,j,k,t) = (i/p)s + (j + b)/q$. | $e(i,j,k,t) \longleftarrow \longrightarrow d(g(i,j,k,t))$ |
| $pq \times 1$ | 01 | $g(i,j,k,t) = (p[(k-j)//q] + [(k-j)//q]//p - i)//pq$<br>$a = g(i,j,k,t)$<br>$l(i,j,k,t) = [(i+a)/p]s + j/q$. | $e(i,j,k,t) \longleftarrow \longrightarrow d(g(i,j,k,t))$. |
| $p \times q$ | 10 | $M(i,j) = [iq + (i/p)//q + j]//pq$;<br>$g(i,j,k,t) = [k - M(i,j)]//pq$;<br>$a = g(i,j,k,t)/q$;<br>$b = g(i,j,k,t)//q$;<br>$l(i,j,k,t) = [(i+a)/p]s + (j+b)/q$. | $e(i,j,k,t) \longleftarrow \longrightarrow d(g(i,j,k,t))$ |

Exemplary circuitry implementing the above address calculations and routing patterns is amply set forth in FIGS. 3–13, which are described below. Of course it should be understood that alternative circuitry, for example, circuitry based upon table lookup could be designed to perform the same functions.

The address calculations and routing patterns noted above are based upon a predetermined distribution of image points among the $pq$ memory modules. Before describing the preferred embodiments, appreciation of the true nature and scope of the invention will be enhanced by first considering the justification for the chosen distribution strategy, and the manner in which the distribution leads to the address calculations and routing patterns summarized in Table 1.

DISTRIBUTION STRATEGY

As stated previously, it is an object of the invention to construct a memory system capable of storing an $rp \times sq$ image array $I(*,*)$ consisting of image points $I(i,j)$, where $i$ lies in the range of $0 \leq i < rp$ and $j$ lies in the range $0 \leq j < sq$. Furthermore, the memory system is required to store the image in a manner permitting access to all $1 \times pq$ and $pq \times 1$ subarrays of $I(*,*)$, and to regularly spaced $p \times q$ subarrays of $I(*,*)$.

If the memory system outlined in FIG. 1 is to store the image array $I(*,*)$, then for each image point $I(i,j)$ it is necessary to determine which of the $pq$ memory modules $21, 23, \ldots,$ or $25$ should store $I(i,j)$. It was observed that when memory modules were assigned the memory module numbers $0, 1, \ldots, pq-1$ as indicated in FIG. 1, the distribution of image points among the memory modules could be described succinctly by specifying an integer-valued module assignment function $M(i,j)$ with the following characteristic:

for any integers $i$ and $j$ on the ranges $0 \leq i < rp$ and signment function $M(i,j)$ assumed the form $M(i,j) = [iq + (i/p)//q + j]//pq$. where the notations "/" and "//" denote, resepctively, the quotient and remainder of integer division, then the $pq$ image points of every $1 \times pq$ subarray, every $pq \times 1$ subarray, and regularly spaced $p \times q$ subarrays would be stored in different memory modules. This would permit simultaneous accessing of the $pq$ image points in the desired subarrays.

The module assignment function $M(i,j) = [iq + \lambda (i/p)//q + j]//pq$ is illustrated in FIG. 2A for the case that $p=q=4$ and $r=s=8$. The hexidecimal number in the jth position of the ith row of the $32 \times 32$ array in FIG. 2A denotes the memory module $M(i,j)$ for storing image point $I(i,j)$. For example, the circled entry in the 5th position of the 6th row is E, which is the hexidecimal notation for 14. This indicates that the image point $I(6,5)$ is stored in the 14th memory module. This may be calculated as $M(i,j) = M(6,5) = [iq + \lambda (i/p)//q+j]//pq = [6 \times 4 + (6/4)//4 + 5]//(4 \times 4)$
$= [24 + (1)//4 + 5]//16 = 30//16 = 14$ It should be readily observed from FIG. 2A that the $pq=16$ image points in any $1 \times pq = 1 \times 16$ subarray are stored in different memory modules. For example, the 16 element horizontal sequence indicated in FIG. 2A shows that the image points $I(6,13), I(6,14), \ldots, I(6,28)$ are stored, respectively, in memory modules 6, 7, 8, 9, 10, 11, 12, 13, 14, 15, 0, 1, 2, 3, 4, and 5. Also, it will be observed from FIG. 2A that the $pq=16$ elements of any $pq \times 1 = 16 \times 1$ subarray are stored in different memory modules. For example, the vertical sequence indicated shows that the image points $I(10,5), I(11,5), \ldots, I(25,5)$ are stored, respectively, in memory modules 15, 3, 8, 12, 0, 4, 5, 9, 13, 1, 6, 10, 14, 2, 7, and 11. Finally, it will be observed from FIG. 2A that the $pq=16$ image points in any regularly spaced $p \times q = 4 \times 4$ subarray, whose upper lefthand element is (i,j), where i is a multiple of $p=4$, are stored in different memory modules. For example, the $4 \times 4$ block indicated in FIG. 2A identifies the memory assignments for the image points in the $4 \times 4$ subarray whose upper lefthand element is the image point I(16,13).

The above module assignment function $M(i,j)$ assigns its image points to each of the $pq$ memory modules without specifying the cell locations in which they are to stored. It was unexpectedly observed that the image points could be conveniently stored in location $A(i,j)$ of memory module $M(i,j)$ if such a function varied according to the form $A(i,j)=(i/p)s+(j/q)$, where $i/p$ and $j/q$ are integer quotients.

The address assignment function $A(i,j)$ is illustrated in FIG. 2B for the case that $p=q=4$ and $r=s=8$. The decimal integer within each $p \times q = 4 \times 4$ block indicates the address of the corresponding $pq=16$ image points. For example, the fifth position on the sixth row falls in the $4 \times 4$ block labeled with decimal 9. This indicates that image point I(6,5) is stored in the 9th cell of memory module M(6,5). This may be calculated as $A(i,j)=A(6,5)=(6/4)8+(5/4)=(1)8+(1)=9$.

ADDRESS CALCULATION

When any of the $1 \times pq$, $pq \times 1$, or $p \times q$ subarrays is to be accessed (read or written), the address calculation portion of address and control circuitry 7 shown in FIG. 1 must calculate, for $0 \leq k<pq$, the address of the unique image point in the subarray stored by the $k$th memory module.

Stated algebraically, if the upper lefthand element of the desired $1 \times pq$, $pq \times 1$, or $p \times q$ subarray is image point $I(i,j)$, and if the variable $t$ is set to any one of the values $t=00$, $t=01$, or $t=10$ in order to indicate, respectively, that a $1 = pq$, $pq \times 1$, or $p \times q$ subarray is to be accessed, then the address to be calculated for module $k$ can be denoted $1(i,j,k,t)$. The form of this address function was noted previously in Table 1, and it can be justified by the following argument.

Suppose that access to a $1 \times pq$ subarray is desired, so that $t=00$. As discussed previously, the module assignment function $M(i,j)=[iq+(i/p)//q+j]//pq$ guarantees that module $k$ stores one of the desired image points $I(i,j)$, $I(i,j+1)$, ..., $I(i,j+pq-1)$. Equivalently, module $k$ stores image point $I(i,j+b)$, where $b$ is an integer lying in the range $0 \leq b<pq$. The distribtuion of image points among memory modules guarantees that image point $I(i,j+b)$ is stored in location $A(i,j+b)=(i/p)s+(j+b)/q$ of memory module $M(i,j+b)=[iq+(i/p)//q+j+b]//pq$. It follows, therefore, that $k=M(i,j+b)$ and that $1(i,j,k,t)=A(i,j+b)$. The foregoing relations can be used to show that $b=[M(i,j+b)-iq-(i/p)//q-j]11pq=[k-iq-\lambda (i/p)//q-j]//pq$. Hence, defining the function $g(i,j,k,t)=[k-iq-(i/p)//q-j]//pq$. we conclude that $b=g(i,j,k,t)$, and that when $t=00$, $1(i,j,k,t)=A(i,j+b)=(i/p)s+(j+b)/q$.

Similarly, suppose that access to a $pq \times 1$ subarray is desired, so that $t=01$. Then the module assignment function $M(i,j)$ guarantees that module $k$ stores one of the large points $I(i,j)$, $I(i+1,j)$, ..., $I(i+pq-1,j)$. Equivalently, module $k$ stores image point $I(i+a,j)$ where $a$ is an integer in the range $0 \leq a<pq$. The distribution of image points guarantees that image point $I(i+a,j)$ is stored in location $A(i+a,j)=[(i+a)/p]s+j/q$ of memory module $M(i+a,j)=[(i+a)q+[(i+a)/p]//q+j]pq$. It follows, therefore, that $k=M(i+a,j)$ and that $1(i,j,k,t)=A(i+a,j)$. The foregoing relations can now be used to show that $a=(p[(k-j)//q]-i+[(k-j)/p]//q//pq$. Hence, defining the function $g(i,j,k,t)=(p[(k-j)//q]-i+[(k-j)/q]11p)//pq$, we conclude that $a=g(i,j,k,t)$ and that $1(i,j,k,t)=A(i+a,j)=[(i+a)/p]s+(j/q)$.

Finally, let it be supposed that access to a $p \times q$ subarray is desired. Thus, $t=10$ and $i$ is a multiple of $p$. As a consequence of the module assignment function $M(i,j)$, module $k$ stores one of the desired image points $I(i,j)$, $I(i,j+1)$, ..., $I(i,j+q-1)$, $I(i+1,j)$, ..., $I(i+p-1,j+q-1)$. Equivalently, module $k$ stores image point $I(i+a,j+b)$, where the integers $a$ and $b$ lie in the respective ranges $0 \leq a < p$ and $0 \leq b < q$. The distribution of image points among memory modules guarantees that image point $I(i+a,j+b)$ is stored in location $A(i+a,j+b)=\lambda[(i+a)/p]s+(j+b)/q$ of memory module $M(i+a,j+b)=\lambda[(i+a)q+[(i+a)/p]11q+j+b]//pq$. Therefore, it follows that $k=M(i+a,j+b)$ and that $1(i,j,k,t)=A(i+a,j+b)$. The foregoing relations, and the fact that $i$ is a multiple of $p$, so that $[(1+a)/p]//q=(i/p)//q$, can be used to show that $aq+b=[M(i+a,j+b)-iq-(i/p)//q-j]//pq=(k-iq-\lambda (i/p)//q-j)//pq$. Hence, by defining the function $g(i,j,k,t)=[k-iq-(i/p)//q-j]//pq$, we conclude that $a=g(i,j,k,t)/q$, $b=g(i,j,k,t)//q$, and $1(i,j,k,t)=A(i+a,j+b)=\lambda [(i+a)/p]s+(j+b)/q$.

ROUTING PATTERNS

As stated previously, whenever a $1 \times pq$, $pq \times 1$, or $p \times q$ subarray of the image array $I(*,*)$ is stored into or retrieved from the memory shown in FIG. 1, each of the memory modules 21, 23, ---, and 25 stores or retrieves a single element of the subarray. Relatedly, the elements of this subarray are routed by permuter 47 from data register 39 to the memory modules for store operations. Likewise, the subarray elements are routed by permuter 49 from the memory modules to the data register for retrieval operations.

The operation of permuters 47 and 49 are controlled by the control portion of the address and control circuitry 7. Stated algebraically, it is apparent that if the upper lefthand element of the $1 \times pq$, $pq \times 1$, or $p \times q$ subarray is the image point $I(i,j)$, and if the variable $t$ is set to one of the values $t=00$, $t=01$, or $t=10$ so as to indicate, respectively, that a $1 \times pq$, $pq \times 1$, or $p \times q$ subarray is to be accessed, then the unique subarray element to be stored into or retrived from module $k$ can be denoted $e(i,j,k,t)$. This element must be routed to or from one of the $pq$ positions $d(0)$, $d(1)$, ..., $d(pq-1)$ of the data register, as indicated previously in Table 1. The routing patterns shown in Table 1 can be justified by the following arguments.

Suppose that a $1 \times pq$ subarray is to be accessed, so that $t=00$. Since the subarray is held in row major order in the data register, element $I(i,j+b)$ of the subarray should be routed to or from position $d(b)$ of the data register. As described in the last section, image point $I(i,j+b)$ is stored in memory module $k$, where $k$ and $b$ are related according to the formula $b=[k-iq-\lambda (i/p)//q-j]//pq=g(i,j,k,t)$. Therefore, the unique element of the $1 = pq$ subarray to be retrieved from or stored into module $k$, namely $I(i,j,+b)=e(i,j,k,t)$, is routed to or from position $d(b)=d(g(i,j,k,t))$ of the data register.

Similarly, suppose that a $pq \times 1$ subarray is desired, so that $t=01$. Then since the subarray is held in row major order in the data register, element $I(i+a,j)$ of the subarray should be routed to or from position $d(a)$ of the data register. Therefore, the unique element of the $pq \times 1$ subarray to be retrieved from or stored into module $k$, namely $I(i+a,j)=e(i,j,k,t)$, is routed to or from position $d(a)$. As described in the last section, the integer a can be calculated according to $a=(p[(k-j)//q-]-i+[(k-j)/q]1/p)//pq=g(i,j,k,t)$. Therefore, the unique element of the $pq \times 1$ subarray to be retrieved from or stored into module $k$, namely $I(i+a,j)=e(i,j,k,t)$, is routed to or from position $d(a)=d(-g(i,j,k,t))$ of the data register.

Finally, suppose that a $p \times q$ subarray is desired, so that $r=10$, and $i$ is a multiple of $p$. Then since the subarray is held in row major order in the data register, element $I(i+a,j+b)$ of the subarray should be routed to or from position $D(aq+b)$ of the data register. As described in the last section, image point $I(i+a,j+b)$ is stored in memory module $k$, where $k$ is related to $a$ and $b$ according to the formula $aq+b=(k-iq-(i/p)//q-j)//pq=g(i,j,k,t)$. Therefore, the unique element of the $p \times q$ subarray to be retrieved from or stored into module $k$, namely, $I(i+a,j+b)=e(i,j,k,t)$, is routed to or from position $d(aq+b)=d(g(i,j,k,t))$ of the data register.

STRUCTURAL DESIGN

Figure 3:
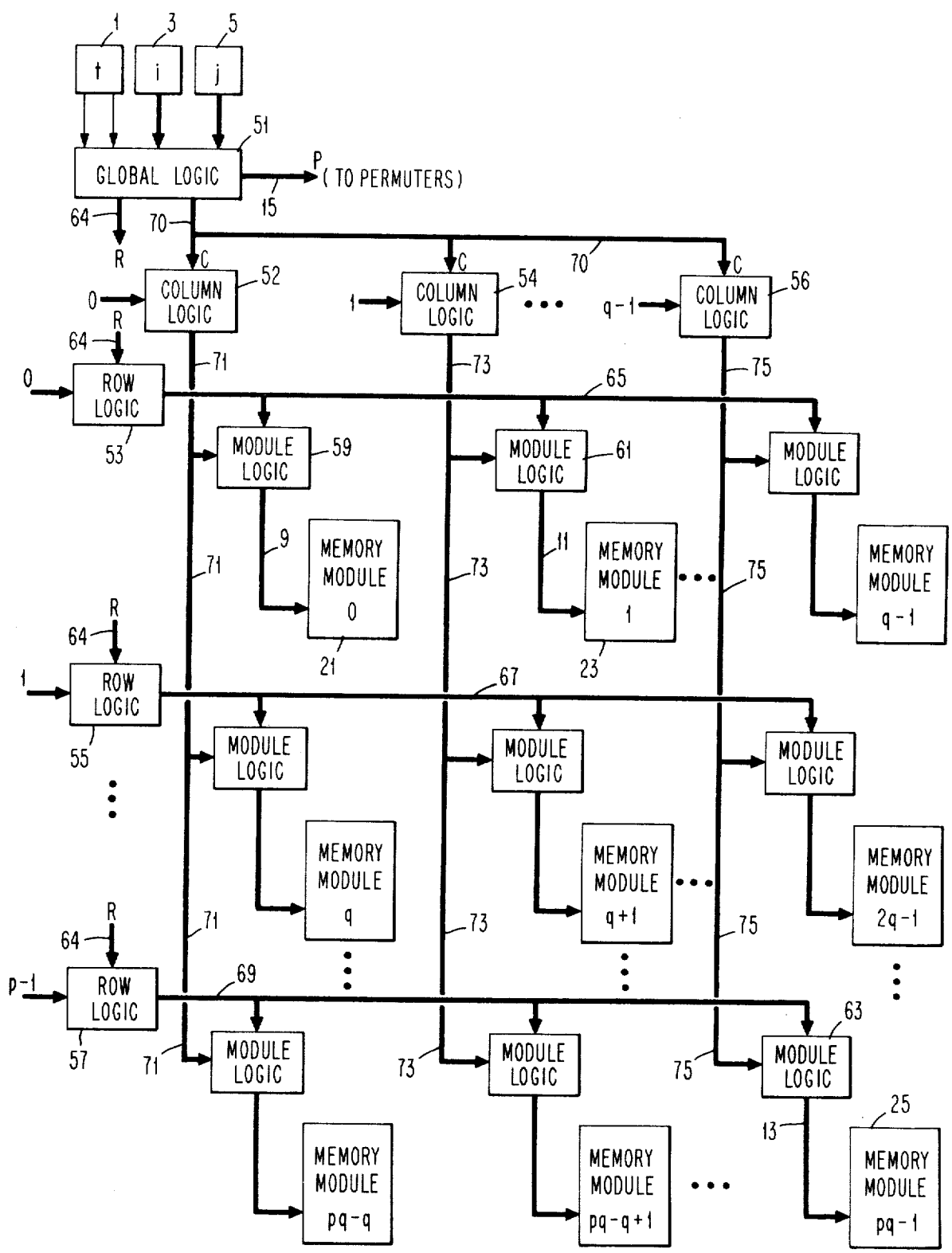
FIG. 3 shows the selective logical details of the address and control circuitry set forth in FIG. 1.

Referring now to FIG. 3, there is provided an overview of the address and control circuitry 7 shown in FIG. 1. As indicated in FIG. 3, the pq memory modules 21, 23 and 25 are arranged into p rows of q modules each. The address and control circuitry comprises: a single global logic component 51; p identical row logic components 53, 55, and 57, one for each row of memory modules; q identical column logic components 52, 54, and 56, one for each column of memory modules; and pq identical module logic components 59, 61, and 63, one for each memory module.

The global logic component 51 operates in response to the subarray shape designation t in register 1, and to the subarray starting coordinates i and j in registers 3 and 5, to calculate the quantities P, R, and C. The quantity P is provided over lines 15 for control of permuters 47 and 49, as shown in FIG. 1. The quantity R is supplied over lines 64 to each of the row logic components 53, 55, and 57. Similarly, the quantity C is supplied over lines 70 to each of the column logic components 52, 54, and 56.

Each of the row logic components 53, 55, and 57 operates in response to a fixed row designation number, and in response to the quantity R calculated by the global logic component 51, to calculate address information used for the calculation of cell addresses for memory modules in the associated row of modules. This address information is provided over line 65, 67, and 69 to the module logic components connected to these memory modules.

Each of the column logic components 52, 54, and 56 operates in response to a fixed column designation number, and in response to the quantity C calculated by the global logic component 51, to calculate address information used for the calculation of cell addresses for memory modules in the associated column of modules. This address information is provided over lines 71, 73, and 75 to the module logic components connected to these memory modules.

Each of the module logic components 59, 61, and 63 operates in response to the address information supplied by one of the row logic components 53, 55, or 57, and in response to the address information supplied by one of the column logic components 52, 54, or 56, to calculate a cell address. In particular, the module logic component associated with the $k$th memory module calculates the cell address $l(i,j,k,t)$. The cell addresses are supplied to the respective memory modules over lines 9, 11, and 13.

FIGS. 4–7 provide, respectively, the detailed logical embodiments of the global logic component 51; one of the row logic components 53, 55, or 57; one of the column logic components 52, 54, or 56; and one of the module logic components 59, 61, or 63. The operation of each component is described both algebraically and with an exemplary circuit design. The algebraic descriptions summarize the inputs to, outputs from, and calculations performed by each component. These algebraic descriptions are appropriate for any combination of design parameters $p$, $q$, $r$, and $s$. The exemplary circuit designs are specific for the case that $p=q=4$ and $r=s=8$.

Figure 4:
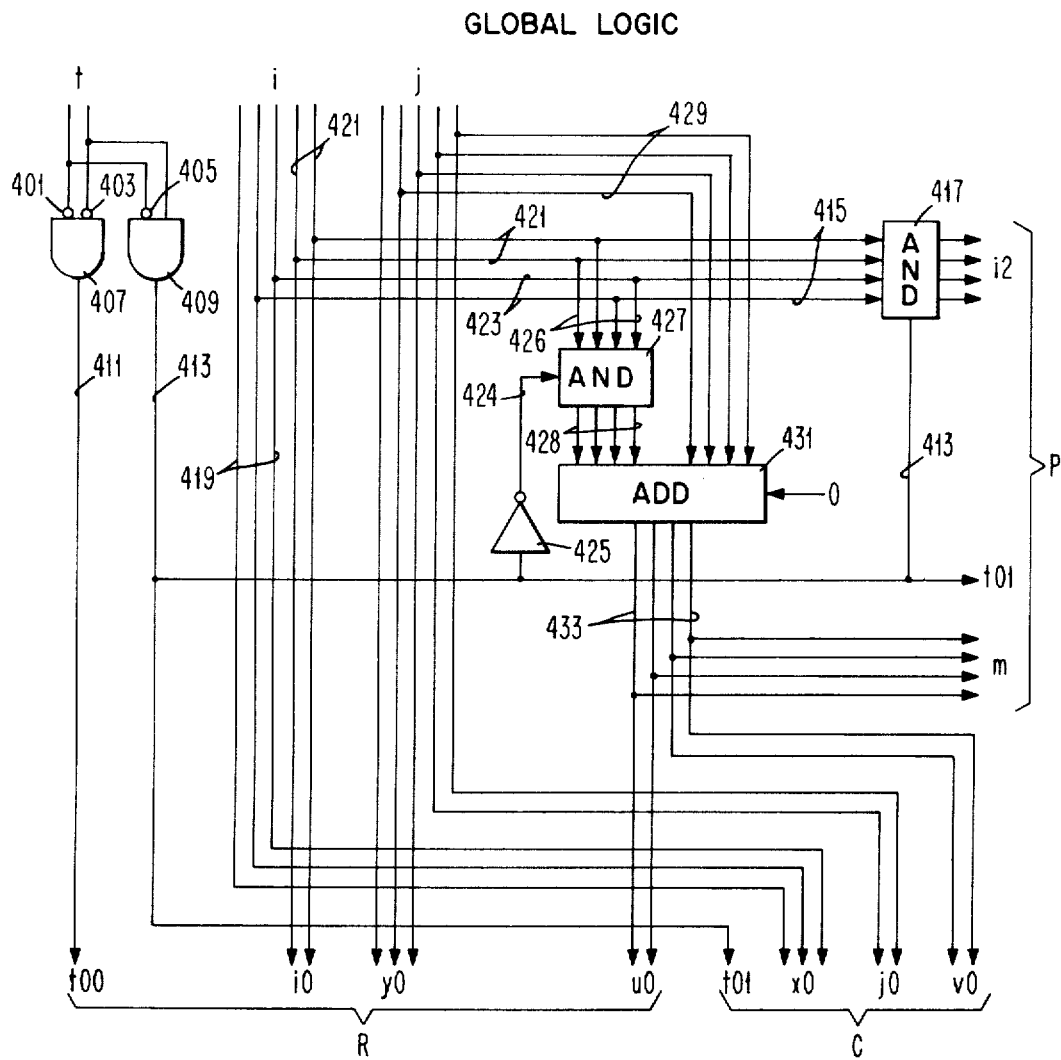
FIGS. 4–7 illustrate detailed logical designs of the global, row, column, and module logics of the counterpart functional elements seen in FIG. 3.

Referring now to FIG. 4, there is provided a detailed description of the global logic component 51. The inputs to this component are the subarray shape designation $t$ and the subarray starting coordinates $i$ and $j$. The outputs from this circuit are the quantities P, R, and C. As indicated in FIG. 4, each of these quantities comprises a bundle of signals. P consists of the values $i2$, $t01$, and $m$; R consists of the values $t00$, $i0$, $y0$, and $u0$; and C consists of the values $t01$, $x0$, $j0$, and $v0$. Each of these values is calculated according to the formulas provided in FIG. 4.

The first two values calculated by the global logic component are the quantities $t00$ and $t01$. The quantity $t00$ is a Boolean value which is true if the input $t$ has the value $t=00$. This can be written symbolically as $t00=EQ(t,00)$. The quantity $t00$ is provided on line 411 by AND gate 407, operating in conjunction with INVERTERS 401 and 403. Similarly, the quantity $t01=EQ(t,01)$ is provided on line 413 by AND gate 409 and INVERTER 405.

The next two values to be calculated by the global logic component are the quantities $x0=i/p$ and $i0=i//p$. That is, $x0$ and $i0$ are, respectively, the quotient and the remainder that result from the integer division of $i$ by $p$. Since the image coordinate $i$ is a binary-coded integer, and since $p=4$ for the exemplary circuit in FIG. 4, $i0$ is just the least significant two bits of $i$, and $x0$ is the remaining bits of $i$. The quantities $i0$ and $x0$ are provided, respectively, on lines 421 and 419.

Another value to be calculated is the quantity $i2=t01(i//pq)$. That is, when the previously calculated Boolean variable $t01$ appearing on line 413 has the value $t01=0$, $i2$ has the value $i2=0$. Alternatively, when $t01=1$, $i2$ is the remainder resulting from the integer dividion of $i$ by the quantity $pq$. Since $i$ is a binarycoded integer, and since $pq=16$ for the exemplary circuit in FIG. 4, the quantity $i//pq$ is just the least significant four bits of $i$, which are supplied over lines 415 to AND gates 417. The remaining input to AND gates 417 is the value $t01$ appearing on line 413. Hence the outputs from AND gates 417 constitute the desired quantity $i2=t01(i//pq)$.

The next two values to be calculted by the global logic component are the quantities $y0=j/q$ and $j0=j//q$. Since the image coordinate $j$ is a binary-coded integer, and since $q=4$ for the exemplary circuit in FIG. 4, $j0$ and $y0$ are, respectively, the least significant two bits of $j$ and the remaining bits of $j$.

Another value to be calculated by the global logic component is the quantity $m=(t01[i0.q+x01/q]+j//pq)//pq$. For the exemplary circuity in FIG. 4, the previously calculated quantities $i0$ and $x0$ are provided, respectively, on lines 421 and 419. The quantity $x0//q$, which is just the least significant two bits of $x0$, is provided on lines 423. The sum $i0.q+x0//q$ can be achieved by juxtapositioning $i0$ and $x0//q$, and this sum is provided on lines 426 to AND gates 427. The other input to AND gates 427 is the value $\overline{t01}$, the complement of the previously calculated value $\overline{t01}$. The value $t01$ is calculated by INVERTER 425 and is supplied via line 424 to AND gates 427. The output from AND gates 427 comprises the quantity $\overline{t01}$ $[i0.q+x0//q]$, and this value is supplied via lines 428 to ADDER 431. The other input to ADDER 431 is the quantity $j//pq$, which is the least significant four bits of $i$. The quantity $j//pq$ is supplied via lines 429 to ADDER 431. Hence, the least significant four bits output on lines 433 from ADDER 431 comprise the quantity $m = (\overline{t01}[i0.q+x0//q]+j//pq)//pq$.

The final two outputs from the global logic component are the quantities $u0=m/q$ and $v0=m//q$. For the exemplary circuit in FIG. 4, these quantities are respectively, the least significant two bits of the previously calculated quantity $m$, and the remaining bits of $m$.

Figure 5:
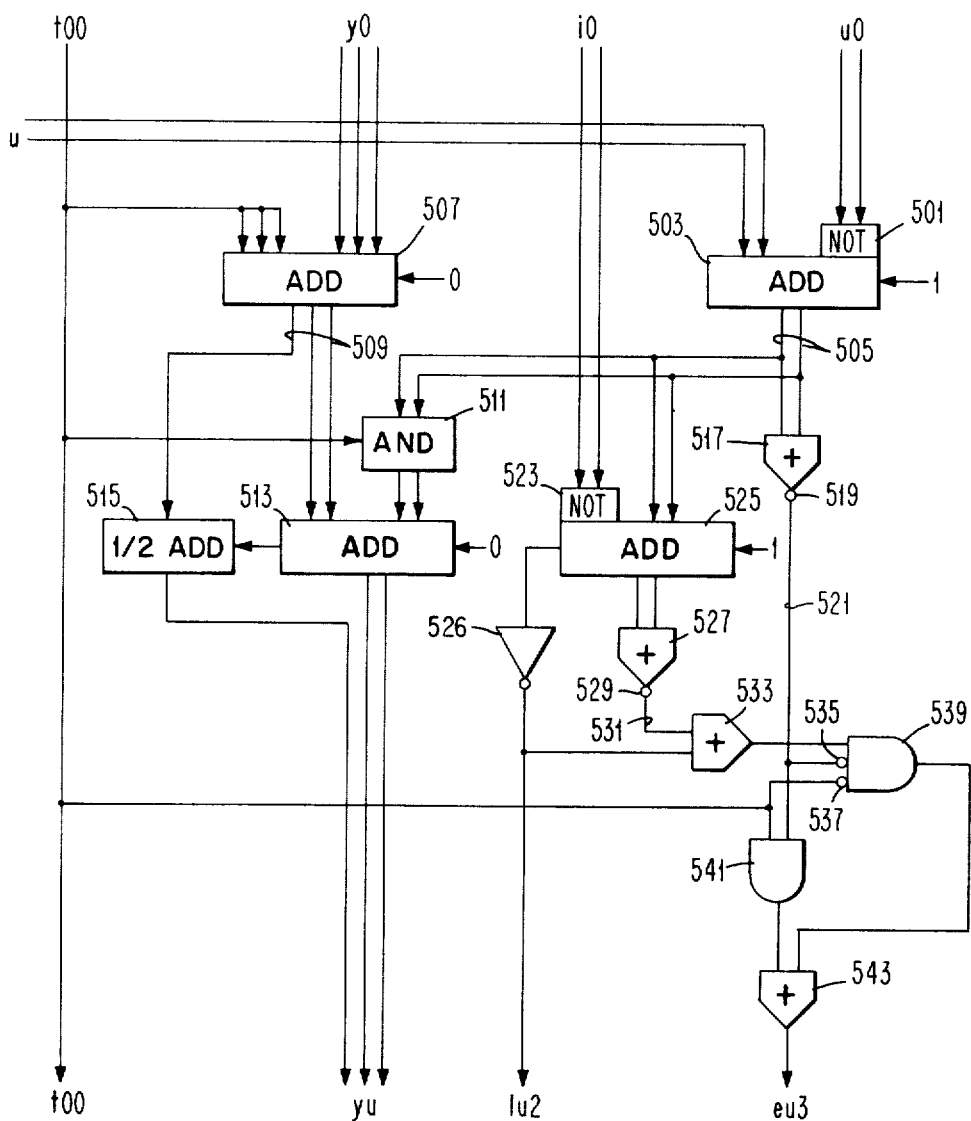

Referring now to FIG. 5, there is provided a detailed description of one of the row logic components 53, 55, or 57 shown in FIG. 3. More particularly, the row logic component associated with the $u$th row of memory modules is described, where $u$ lies in the range $0 \le u < p$. The inputs to this row logic component are the row designation number $u$ and the bundle of signals R. R comprises the values $t00$, $i0$, $y0$, and $u0$ calculated by the global logic component 51. The outputs from the row logic component consist of the values $t00$, $yu$, $1u2$, and $eu3$, calculated according to the formulas provided in FIG. 5. These values comprise address information used in the calcuation of cell addresses for memory modules on the $u$th row of modules.

The first value to be calculated by the row logic component is the quantity $z=(u-u0)//p$. For the exemplary circuit in FIG. 5, INVERTER gates 501 and ADDER 503 serve to subtract $u0$ from $u$, according to the well-known relation for binary arithmetic, $u-u0=u+\overline{u0}+1$. The least significant two bits output on lines 505 from adder 503 comprise the quantity $z=(u-u0)//p$.

The next value to be calculated by the row logic component is the quantity $yu=y0+t00(z-1)$. ADDER 507 supplies the quantity $y0-t00$ to ADDER 513 and HALF-ADDER 515 via lines 509. AND gates 511 supply the quantity $t00.z$, to ADDER 513, and hence ADDER 513 and HALF-ADDER 515 together calculate the quantity $yu=y0+t00(z-1)$.

Another value to be calculated by the row logic component is the quantity $eu1=EQ(z, 0)$. That is, $eu1$ is a Boolean variable with the value $eu1=1$ if $z=0$ and with value $eu1=0$ if $z \ne 0$. In FIG. 5, OR gate 517 and INVERTER 519 determine whether $z=0$ and provide the signal $eu1=EQ(z,0)$ on line 521.

Additional values to be calculated by the row logic component are the Boolean variables $lu2=LT(z,i0)$ and $eu2=EQ(z,i0)$. That is, $1u=1$ if $z<i0$ and $eu2=1$ if $z=i0$. In FIG. 5, INVERTER gates 523 and ADDER 525 serve to subtract $i0$ from $z$ according to the relation $z-i0=z+\overline{i0}+1$. INVERTER 526 operates in the carry from ADDER 525 to calculate $lu2=LT(z-i0,0)=LT(-z,i0)$. OR gate 527 and INVERTER 529 provide the variable $eu2=EQ(z-i0,0)=EQ(i\,z,i0)$ on line 531.

The final value to be calculated by the row logic component is the Boolean variable $eu3=t00.eu1+\overline{t0}$. $\overline{0.eu1}(1u2+eu2)$. In FIG. 5, this variable is calculated by OR gates 533 and 543, INVERTER gates 535 and 537, and AND gates 539 and 541.

Figure 6:
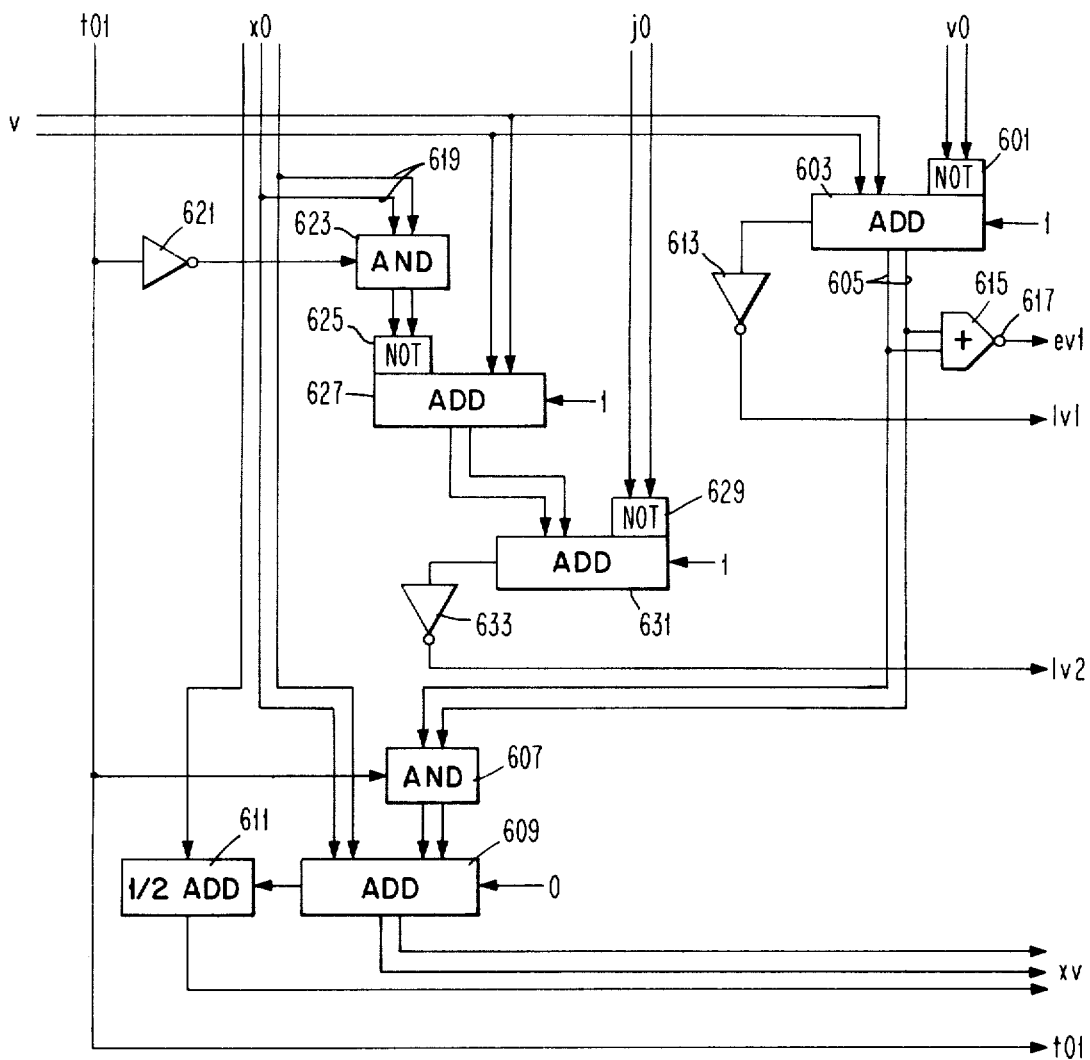

Referring now to FIG. 6, there is provided a detailed description of one of the column logic components 52, 54, or 56 shown in FIG. 3. More particularly, the column logic component associated with the $v$th column of memory modules is described, where $v$ lies in the range $0 \le v < q$. The inputs to this column logic component are the column designation number $v$ and the bundle of signals C. C comprises the values $t01$, $x0$, $j0$, and $v0$ calculated by the global logic component 51. The outputs from the column logic component consist of the values $t01$, $xv$, $1v1$, $ev1$, and $1v2$, calculated according to the formulas provided in FIG. 6. These values comprise address information used in the calculation of cell addresses for memory modules on the $v$th column of modules.

The first value to be calculated by the column logic component is the quantity $xv=x0+t01[(v-v0)//q]$. INVERTER gates 601 and ADDER 603 serve to subtract $v0$ from $v$. The least significant two bits output on lines 605 from ADDER 603 comprise the quantity $(v-v0)//q$. Hence, AND gates 607, ADDER 609, and HALF-ADDER 611 serve to calculate the quantity $xv=x0+t01[v-v0)//q]$.

The next two values to be calculated by the column logic component are the Boolean variables $1v1=LT(v,v0)$ and $ev1=EQ(v,v0)$. That is, $1v1=1$ if $v<v0$, while $ev1=1$ if $v=v0$. INVERTER 613 operates on the carry from ADDER 603 to calculate $1v1=LT(v-v0,0)=LT(v,v0)$, while OR gate 615 and INVERTER 617 calculate $ev1=EQ((v-v0)//q,0)=EQ(v,v0)$.

The final value to be calculated by the column logic component is the Boolean variable $1v2=LI([v-\overline{t01}(x0//q)]//q,j0)$. In FIG. 6, the quantity $x0//q$ is the least significant two bits of $x0$, and this quantity is provided on lines 619 to AND gate 623. Hence, INVERTER 621 and AND gate 623 provide the quantity $\overline{t01}(x0//q)$ to INVERTER gates 625. ADDER 627 and INVERTER gates 625 serve to subtract $\overline{t01}(x0//q)$ from $v$, providing the least significant two bits of this difference, namely $[v-\overline{t01}(x0//q)]//q$, to ADDER 631. ADDER 631 and INVERTER gates 629 serve to subtract $j0$ from the quantity $[v-\overline{t01}(x0//q)]//$. Finally, INVERTER 633 operates on the carry from ADDER 631 to calculate $1v2=LT([v-\overline{t01}(x0//q)]//q-j0,0)=LT([v-\overline{t01}(x0//q)]//q,j0)$.

Figure 7:
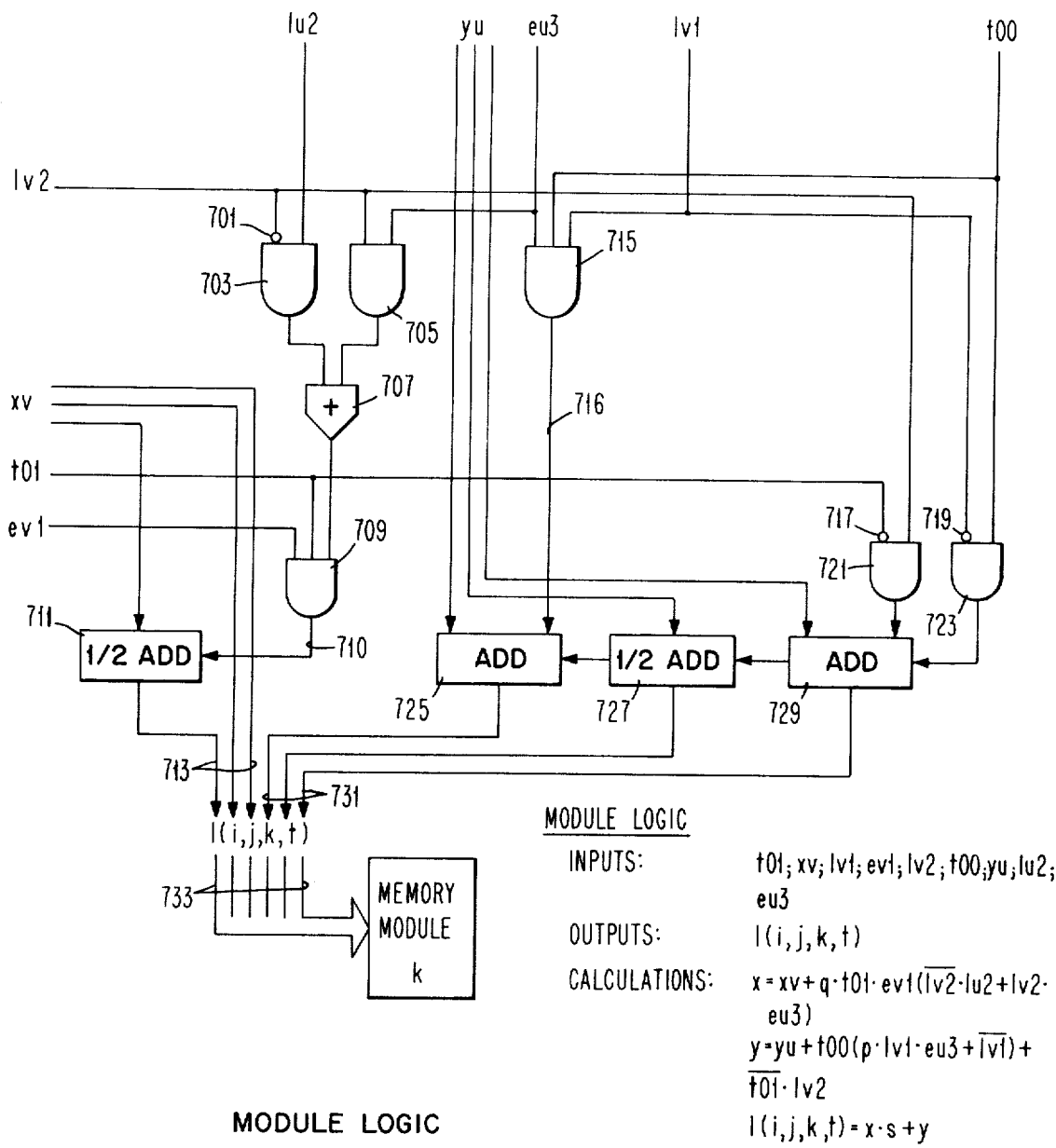

Referring now to FIG. 7, there is provided a detailed description of one of the module logic components 59, 61, or 63 shown in FIG. 3. More particularly, the module logic component associated with the $k$th memory module is described, where $k$ lies in the range $0 \le k < pq$. The inputs to this circuit include the quantities $t01$, $xv$, $1v1$, $ev1$, and $1v2$ provided by the $v$ th column logic component, where $v$ is related to $k$ according to the formula $v=k//q$. Additional inputs to the module logic component are the quantities $t00$, $yu$, $1u2$, and $eu3$ provided by the $u$th row logic component, where $u$ and $k$ are related by the formula $u=k/q$. The single output from the module logic component is the cell address $1(i,j,k,t)$ calculated according to the formulas provided in FIG. 7. This cell address is provided to the $k$th memory module. Note, the combinational logic interior to the $k$th memory module responsive to the cell address $1(i,j,k,t)$ may be fashioned according to any one of numerous methods, as for example, that shown in "Logical Design for Digital Computers" by Montgomery Phister, John Wiley and Sons, New York, 1958.

The first value to be calculated by the module logic component is the quantity $x=xv+q\cdot t01\cdot ev1(\overline{1v2}\cdot 1u2+1v2\cdot eu3)$. That is, $q$ times the Boolean quantity $t01\cdot ev1(\overline{1v2}\cdot 1u2+1v2\cdot eu3)$ is to be added to $xv$. In FIG. 7, this Boolean quantity is calculated and provided on line 710 by INVERTER 701, AND gates 703 and 705, OR gate 707, and AND gate 709. Since $q=4$ for the exemplary circuit in FIG. 7, HALF-ADDER 711 serves to calculate $x=xv+q\cdot t01\cdot ev1(\overline{1v2}\cdot 1v2+1v2\cdot eu3)$ by adding the Boolean quantity appearing on line 710 to the most significant bit of $xv$. The value $x$ is thus provided on lines 713.

The next value to be calculated by the module logic component is the quantity $y=yu+p\cdot t00\cdot 1v\cdot 1\cdot eu3+t00\cdot\overline{1v1}+t\overline{01}\cdot 1v2$. In FIG. 7, this quantity is calculated and provided on lines 731 by ADDER 725, HALF-ADDER 727, and ADDER 729. The Boolean quantity $t00\cdot 1v1\cdot eu3$ is calculated by AND gate 715 and is provided on line 716 to ADDER 725. ADDER 725 serves to and $p=4$ times this Boolean quantity on line 716 to $yu$, by adding the Boolean quantity on line 716 to the most significant bit of $yu$. The two Boolean quantities $t00\cdot\overline{1v1}$ and $t\overline{01}\cdot 1v2$ are calculated, respectively, by INVERTER 719 and AND gate 723, and by INVERTER 717 and AND gate 721. These two Boolean values are added to the least significant bit of $yu$ by ADDER 729.

The final value to be calculated by the module logic component associated with the $k$th memory module is the cell address $1(i,j,k,t)=x\cdot s+y$. For the exemplary circuit in FIG. 7, $s=8$ and $y<8$, so that $1(i,j,k,t)$ can be achieved simply by juxtapositioning the previously calculated values $x$ and $y$ appearing, respectively, on lines 713 and 731. The cell address $1(i,j,k,t)$ is supplied to the $k$th memory module over lines 733.

FIGS. 8–13 describe the routing circuitry 8 shown in FIG. 1. This routing circuitry includes permuters 47 and 49, which route image points of a $1\times pq$, $pq\times 1$, or $p\times q$ subarray of points between the data register 39 and the memory modules 21, 23, and 25. The routing circuitry is controlled by the bundle of signals P provided on lines 15 by the global logic component 51 of the address and control circuitry 7, as shown in FIGS. 3 and 4.

Figure 8:
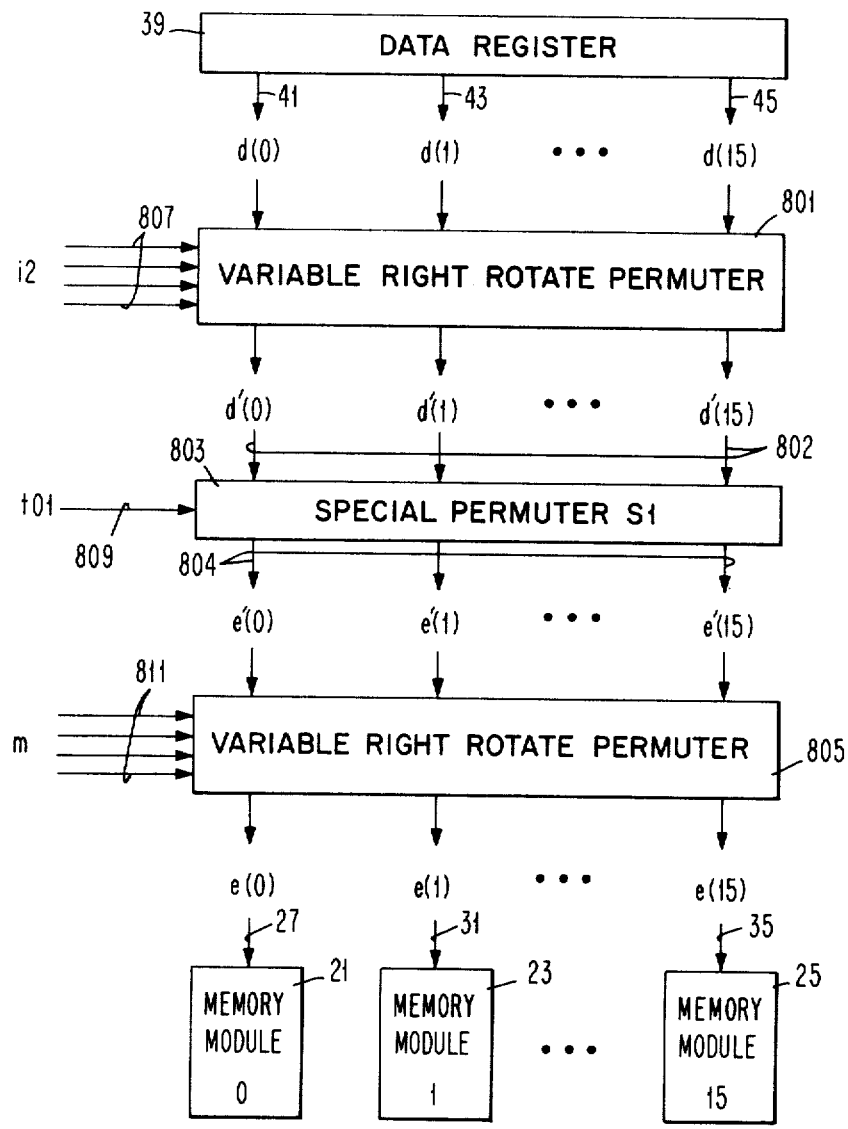
FIGS. 8–13 show detailed logic for the routing circuitry seen in FIG. 1.

Referring now to FIG. 8, there is provided an overview of the permuter P1 that routes subarray points from the data register 39 to the appropriate memory modules 21, 23, and 25. The operation of permuter P1 is described both algebraically and with an exemplary circuit design. The algebraic description is appropriate for any combination of design parameters $p$ and $q$, although the exemplary circuit design is specific for the case that $p=q=4$.

As shown in FIG. 8, permuter P1 comprises three separate permuters, two variable right rotate permuters 801 and 805, and a special permuter 803. These three permuters are controlled by the values $i2$, $t01$ and $m$ appearing, respectively, on lines 807, 809, and 811. These three values together comprise the bundle of signals P provided by the global logic component of the address and control circuitry as shown in FIG. 4.

Figure 9:
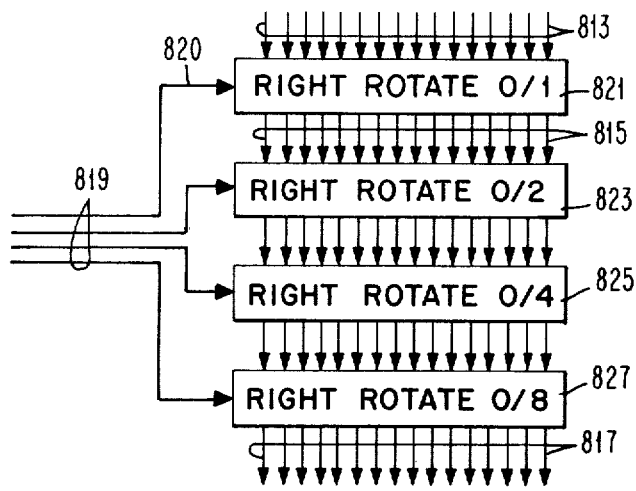

FIG. 9 provides an exemplary design for the variable right rotate permuters 801 and 805 shown in FIG. 8. This permuter has sixteen data inputs 813, four control inputs 819, and sixteen data outputs 817. The sequence of image points input on lines 813 is rotated to the right by a number of positions equal to the binary control value provided on lines 819, and the rotated sequence of points is output on lines 817. The circuit in FIG. 9 uses four simple permuters 821, 823, 825, and 827 to achieve the desired rotation. Each of these simple permuters responds to a single bit of the control value on lines 819 by rotating its inputs by a fixed amount if the control bit is a 1 and by not rotating its inputs if the control bit is a 0. For example, permuter 821 responds to the least significant control bit supplied thereto on line 820 by rotating its inputs one position to the right if the control bit is a 1 and by not rotating its inputs if the control bit is a 0. In either case the rotated or unrotated inputs are supplied by permuter 821 on lines 815.

Figure 10:
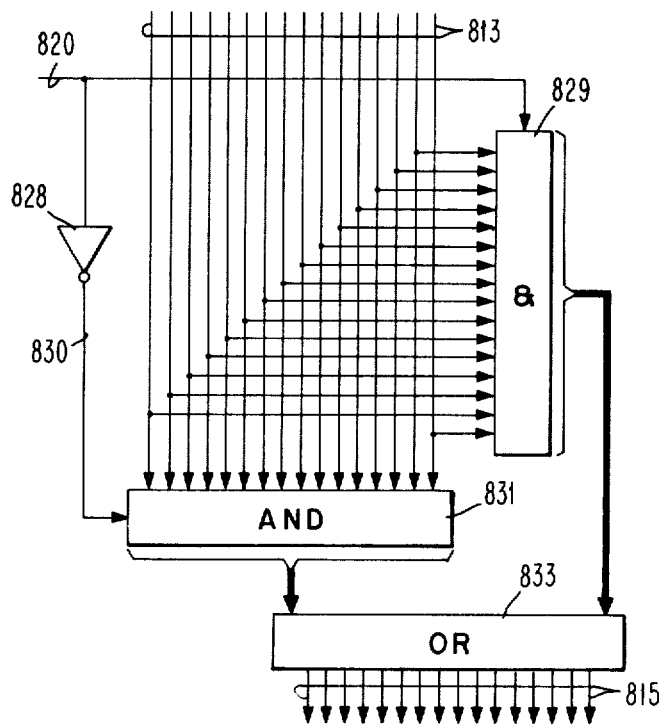

FIG. 10 provides an exemplary design for the permuter 821 shown in FIG. 9. The data inputs on lines 813 are provided without rotation to AND gates 831. These data inputs are also rotated to the right by one position and supplied to AND gates 829. If the control bit appearing on line 820 is a logical 0, then AND gates 829 are blocked, and INVERTER 828 provides an enabling signal on line 830 to AND gates 831. The data inputs on lines 813 are thus supplied without rotation to output lines 815, via AND gates 831 and OR gates 833. Conversely, if the control bit appearing on line 820 is a logical 1, then AND gates 829 are enabled, and INVERTER 828 provides a blocking signal on line 830 to AND gates 831. The data inputs on lines 813 are thus supplied in rotated form to the output lines 815, via AND gates 829 and OR gates 833.

Figure 11:
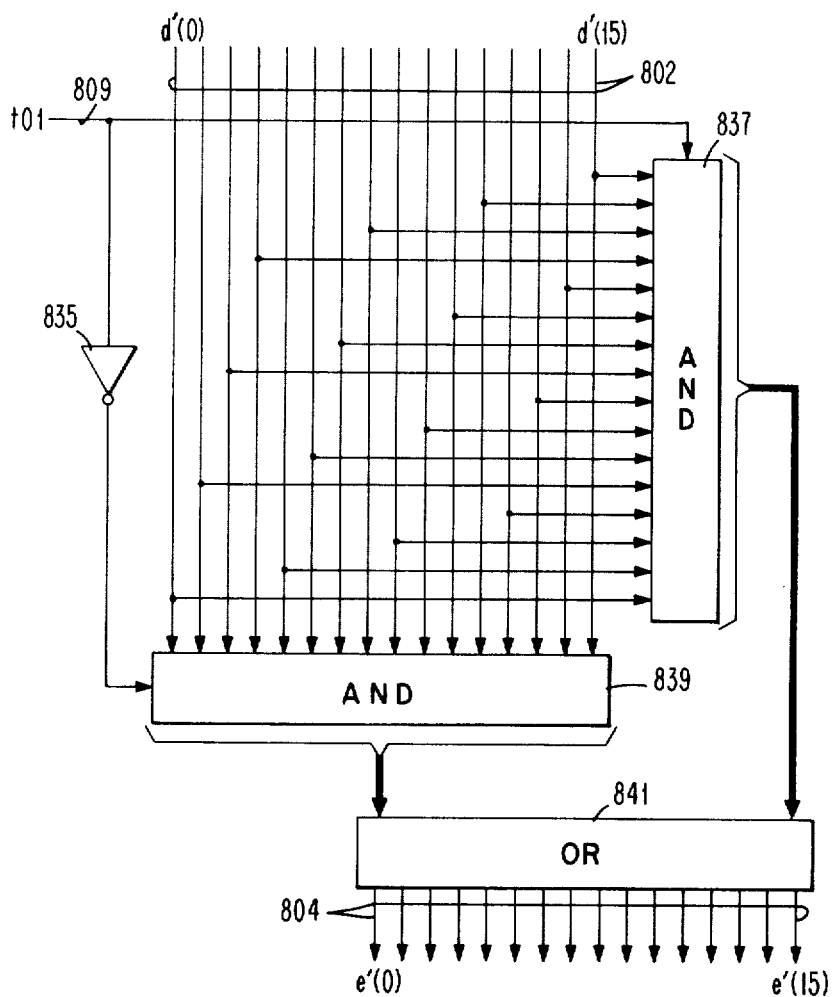

The variable right rotate permuters 801 and 805 required by permuter P1 in FIG. 8 have now been described. It remains to describe special permuter S1, which is labeled as permuter 803 in FIG. 8. This permuter has sixteen data inputs $d'(0)$, $d'(1)$, ..., $d'(15)$ supplied thereto on lines 802, a single control bit $01$ supplied on line 809, and sixteen data outputs $e'(0)$, $e'(1)$, ..., $e'(15)$ provided on lines 804. FIG. 11 describes special permuter S1 algebraically and with an exemplary circuit. The algebraic description is appropriate for any combination of the design parameters $p$ and $q$, although the circuit design is specific for the case that $p=q=4$.

As indicated in FIG. 11, the outputs provided by special permuter S1 on lines 804 can be described by the relation $e'(k)=\overline{t01}\cdot d'(k)+t01\cdot d'(p[k//q]+k/q)$, $0 \le k<pq$. That is, if the control input $t01$ is a logical 0, so that its complement $\overline{t01}$ is a logical 1, then the $k$th output $e'(k)$ equals the $k$th input $d'(k)$. In FIG. 11, the control input $t01=0$ blocks AND gates 837, INVERTER 835 serves to enable AND gates 839, and the inputs appearing on lines 802 are transmitted in unpermuted order to the output lines 804, via AND gates 839 and OR gates 841. Conversely, if the control input $t01$ is a logical 1, then the $k$th output $e'(k)$ becomes the input $d'(p[k//q]+k/q)$. In FIG. 11, the control variable $t01=1$ enables AND gates 837 and is used by INVERTER 835 to block AND gates 839. The input $d'(p[k//q]+k/q) = d'(4[k//4]+k/4)$ is thus routed to the output $e'(k)$, via AND gates 837 and OR gates 841.

Figure 12:
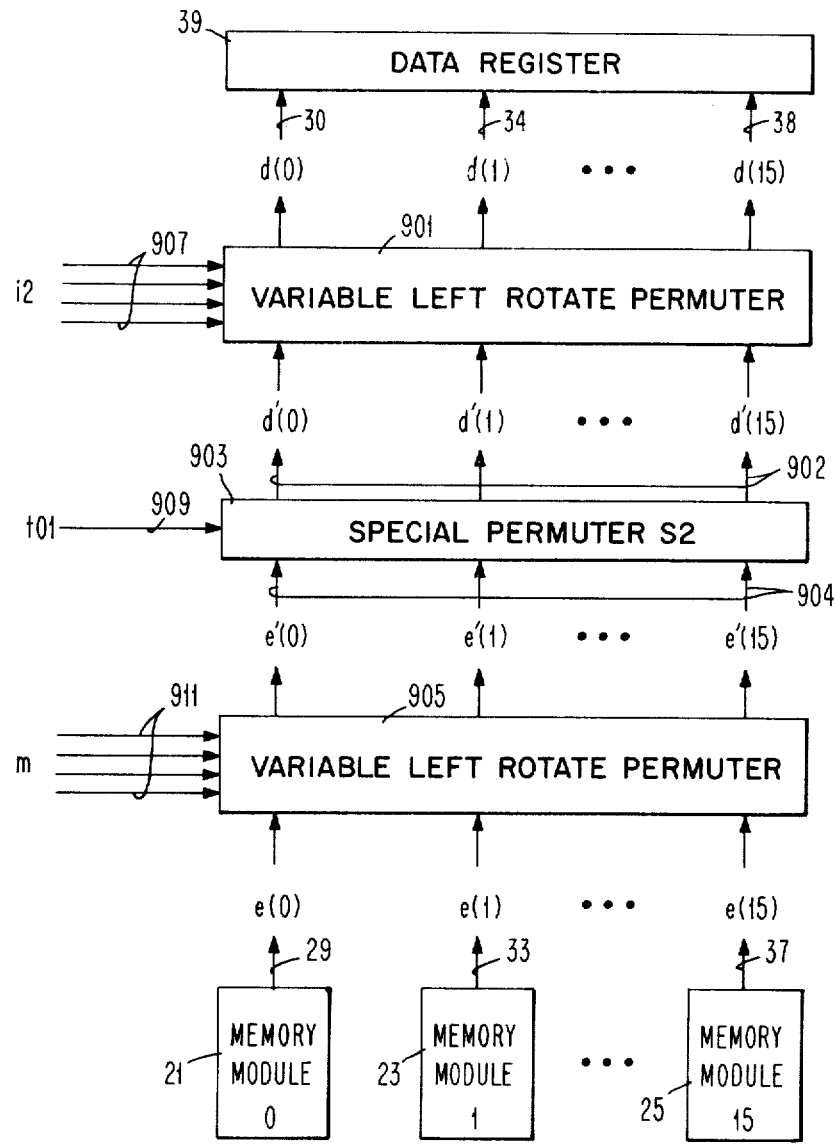

Referring now to FIG. 12, there is provided an overview of the permuter P2 that routes subarray points accessed from memory modules 21, 23, and 25 to the appropriate positions of data register 39. The operation of permuter P2 is described both algebraically and with an exemplary circuit design. The algebraic description is appropriate for any combination of the design parameters $p$ and $q$, although the exemplary circuit design is-specific for the case that $p=q=4$.

As shown in FIG. 12, permuter P2 comprises three separate permuters, two variable left rotate permuters 901 and 905, and a special permuter 903. These permuters are controlled by the values $i2$, $t01$, and $m$ appearing, respectively, on lines 907, 909, and 911. These three values together comprise the bundle of signals P provided by the global logic component 51 of address and control circuitry 7 as shown in FIGS. 1, 3, and 4.

Figure 13:
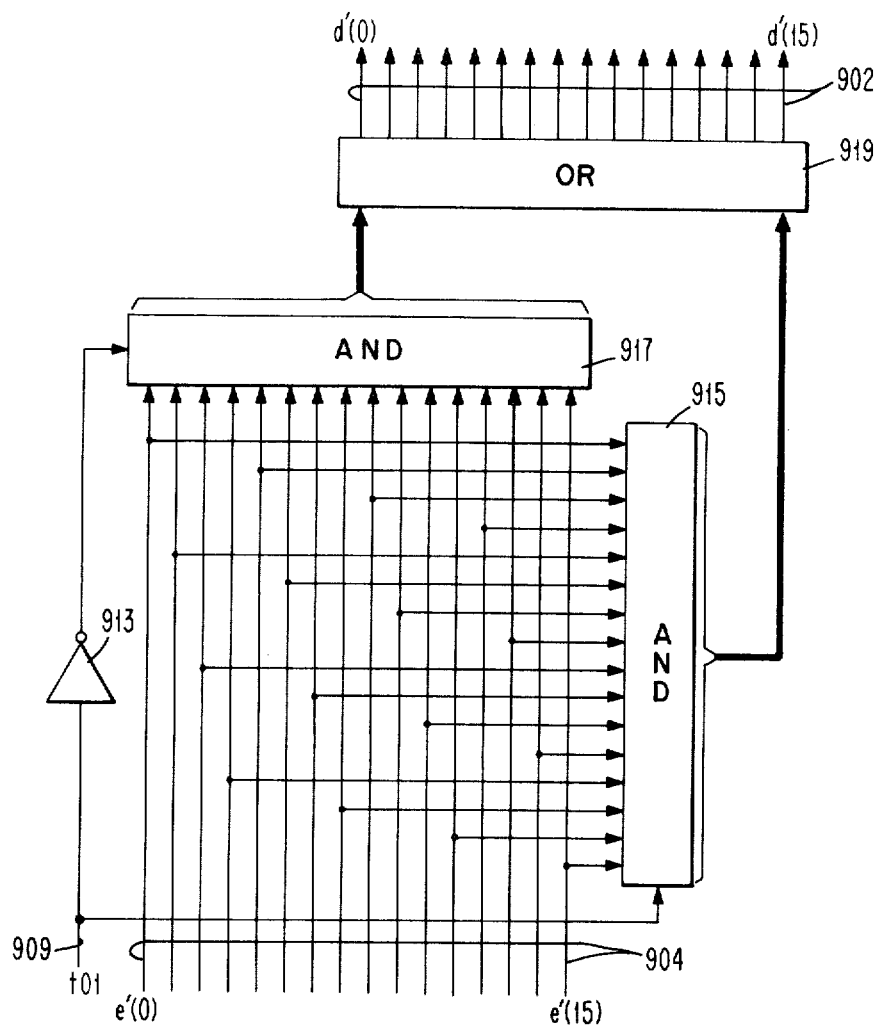

The variable left rotate permuters 901 and 905 are simply upside-down versions of the variable right rotate permuters described by FIGS. 9 and 10. The special permuter S2, which is labeled as permuter 903 in FIG. 12, is described in FIG. 13. As indicated in FIG. 13, the outputs provided on lines 902 by special permuter S2 are one of two permutations of the inputs supplied thereto on lines 904. In particular, if the control input $t01$ appearing on line 909 is a logical 0, then the outputs are identical to the inputs. This identity presentation is achieved by the circuit in FIG. 13 because the control input $t01=0$ blocks AND gates 915 and IN-VERTER 913 serves to enable AND gates 917, so that the inputs are transmitted by AND gates 917 and OR gates 919. Conversely, if the control input $t01$ is a logical 1, then the permutation achieved by special permuter S2 is described by the relation $d'(k)=e'(q[k//p]+k/p)$, $0 \leq k<pq$. In FIG. 13, the control variable $t01=1$ enables AND gates 915 and is used by IN-VERTER 913 to block AND gates 917. The input $e'(q[k//p]+k/p)=e'(4[k//4]+k/4)$ is thus routed to output $d'(k)$, via AND gates 915 and OR gates 919.

In summary a memory access method and apparatus has been described which permits access to all $1 \times pq$ subarrays, all $pq \times 1$ subarrays, and regularly-spaced $p \times q$ subarrays within an image array of size $rp \times sq$ stored in a word organized random access memory, if the data is distributed and accessed according to the predetermined relationships described. The memory system implementing the distribution and access functions requires essentiall only $pq$ memory modules, two $pq$ element permuters, and associated address calculation circuitry in order to provide access to the subarrays. Also, the memory system can be extended by n-fold replication to handle grey scale or color images whose image points each require n bits of storage, or to handle any other type of array.

It is to be understood that the particular embodiment of the invention described above and shown in the drawings is merely illustrative and not restrictive on the broad invention, that various changes in design, structure and arrangement may be made without departure from the spirit of the broader aspects of the invention as defined in the appended claims.

What is claimed is:

1. A word organized random access memory system modified for image processing operations so that the memory system can store an image array comprising a predetermined number rpsq of image points arranged in a predetermined number rp of rows with a predetermined number sq of image points in each row, and modified so that every $1 \times pq$ subarray, every $pq \times 1$ subarray and every regularly spaced $p \times q$ subarray of the $rp \times sq$ image array can be accessed in a single memory cycle, the system comprising:

memory means (21, 23, 25) for storing rpsq image points in the cells of pq different memory modules, each memory module being an entity capable of storing rs image points in distinguishable cells, only one cell of each module being accessible at any single instant of time;

means (1, 3, 5) for selectively designating, from all $1 \times pq$ subarrays, all $pq \times 1$ subarrays and all regularly spaced $p \times q$ subarrays stored in said memory means, which subarray is to be accessed; and accessing means (7, 47, 39, 49) responsive to said designating means for causing each image point in the designated subarray to be selectively read from or written into a predetermined cell of a predetermined memory module so that the entire designated subarray is accessed in a single memory cycle.

2. A memory system according to claim 1 wherein the designating means include:

means (1) for designating the shape of the subarray to be accessed, and means (3,5) for designating the location of the starting point of the subarray to be accessed.

3. A memory system according to claim 1 wherein the memory modules are labeled as modules $0, 1, \ldots, pq-1$, and wherein the memory module predetermined for storing the $j$th image point on the $i$th row of the image array is given by the relation $(iq + j + (i/p)//q)//pq$, which denotes the remainder that results when the integer value $p$ times $q$ is divided into the integer sum of $i$ times $q$ plus $j$ plus the remainder when the quotient $i$ divided by $p$ is divided by $q$.

4. A memory system according to claim 1 wherein the cells of each memory module are labeled as cells $0, 1, \ldots, rs-1$, and wherein the cell predetermined for storing the jth image point on the $i$th row of the image array is given by the relation $j/q + (i/p)s$, which denotes the quotient $j$ divided by $q$ added to the product of $s$ and $i$ divided by $p$.

5. A memory system according to claim 1, wherein the accessing means include:

a data register (39) having a capacity of at least $pq$ image points;

routing circuitry (47, 49) and routing control circuitry (7, 15) for causing each image point to be routed between the data register and the predetermined memory module; and address calculation circuitry (7, 9, 11, 13) coacting with the routing circuitry and the routing control circuitry for causing each image point to be selectively retrieved from or written into the predetermined cell location of the predetermined module.

6. A word organized random access memory system modified for image processing operations so that pq image points of all $1 \times pq$ subarrays, all $pq \times 1$ subarrays, and all regularly spaced $p \times q$ subarrays of at most an $rp \times sq$ image array $I(*,*)$ storable in the memory system can be selectively retrieved from or written into the system in a single memory cycle; each image point $I(i,j)$ assuming a Boolean value when $i$ and $j$ lie in the respective ranges $0 \leq i<rp$ and $0 \leq j<sq$, the system comprising:

memory means (21, 23, 25) for storing rpsq image points in the cells of pq different memory modules, each memory module being an entity capable of storing rs image points in distinguishable cells, only one cell of each module being accessible at any single instant of time;

means (1) for designating the shape of a subarray to be accessed, as for example, with $t=00$ for a $1 \times pq$ array, $t=01$ for a $pq \times 1$ array and $t=10$ for a $p \times q$ array;

means (3, 5) for designating the location of the starting point $I(i,j)$ of the subarray to be accessed;

a register (39) for holding at least pq image points;

routing circuitry (15, 47, 49) for causing the appropriate subarray points to be routed between the $k$th memory module and the $g(i,j,k,t)$th register location, where $k$ lies in the range $0 \leq k < pq$ and where the function $g(i,j,k,t)$ is defined by the relation:

$g(i,j,k,t)=[k+j-iq+(i/p)//q]//pq$, if $t=00$, which denotes the remainder when the product $p$ times $q$ is divided into the integer sum of $k$ plus $j$ minus $i$ times $q$ plus the remainder resulting from the division of $q$ into the quotient $i$ divided by $p$;

$g(i,j,k,t)=[p([k-j]//q)-i+([k-j]/q)//p]//pq$, if $t=01$, which denotes the remainder when the product $p$ times $q$ is divided into the sum of three terms: $p$ times the remainder when $q$ is divided into $k$ minus $j$; minus $i$; and the remainder when $p$ is divided into the quotient $k$ minus $j$ divided by $q$;

$g(i,j,k,t)=[k+j-iq+(i/p)//q]//pq$, if $t=10$, and addressing circuitry (7) coacting with the routing circuitry and responsive to the designation of subarray shape and of the subarray starting point $I(i,j)$ for determining the appropriate cell location $1(i,j,k,t)$ within the $k$th module according to the relation:

$1(i,j,k,t)=(i/p)s+[j+g(i,j,k,t)]/q$, if $t=00$, which denotes the sum of two terms: $s$ times the quotient when $p$ is divided into $i$; and the quotient when $q$ is divided into the sum $j$ plus $g(i,j,k,t)$;

$1(i,j,k,t)=[(i+g(i,j,k,t))/p]s+j/p$, if $t=01$, which denotes the sum of two terms: $s$ times the quotient when $p$ is divided into the sum $i$ plus $g(i,j,k,t)$; and the quotient when $q$ is divided into $j$;

$1(i,j,k,t)=[(i+g(i,j,k,t)/q)/p]s+(j+g(i,j,k,t)//q)/q$, if $t=10$, which denotes the sum of two terms: $s$ times the quotient when $p$ is divided into the sum $i$ plus the quotient $g(i,j,k,t)$ divided by $q$; and the quotient when $q$ is divided into the sum $j$ plus the remainder when $g(i,j,k,t)$ is divided by $q$.

* * * * *

PO-1050
(5/69)

UNITED STATES PATENT OFFICE
CERTIFICATE OF CORRECTION

Patent No. 3,996,559     Dated December 7, 1976

Inventor(s) Thomas Harvey Morrin and David Curtis Van Voorhis   Page 1 of 3

It is certified that error appears in the above-identified patent and that said Letters Patent are hereby corrected as shown below:

Col. 2, Line 1, "niety" should read --ninety--;

Col. 2, line 27, "pq" should read --to--;

Col. 3, line 58, "of", first occurrence, should read -- or --.

Col. 4, line 15, "prmits" should read --permits--;

Col. 4, line 34, "T=10" should read --t=10--;

Col. 6, line 41, "M(i,j)=[iq+$\lambda$" should read --M(i,j)=[iq+--;

Col. 6, line 50, "[iq + $\lambda$" should read --[iq + --;

Col. 6, line 68, after the word "subarray," and before the word "whose" please insert --that is, any 4x4 subarray--;

Col. 7, line 3, After the word "memory" and before the word "assignments" please insert the word --module--;

Col. 7, lines 8 and 9, please underscore the words <u>without specifying the cell locations in which they are to stored</u>.

Col. 7, line 35, "1=pq," should read --1xpq,--;

Col. 7, line 52, "b=[M(i,j,+b)-iq-(i/p)//q-J]11pq=[k-iq-$\lambda$" should read --b=[M(i,j +b)-iq-(i/p_//q-j]//pq=[k-iq---

UNITED STATES PATENT OFFICE
CERTIFICATE OF CORRECTION

Patent No. 3,996,559  Dated December 7, 1976

Inventor(s) Thomas Harvey Morrin and David Curtis Van Voorhis

It is certified that error appears in the above-identified patent and that said Letters Patent are hereby corrected as shown below:

continued -  Page 2 of 3

Col. 8, line 2, "]-i+[(k-j)/q]11p)//pq," should read --]-i+[(k-j)/q]//p)//pq,--;

Col. 8, line 13, "A(i+a,j+b)=λ" should read --A(i+a,j+b)=---;

Col. 8, line 14, "M(i+a,j+b)=λ" should read --M(i+a,j+b)--;

Col. 8, line 15, [(i+a)q+[(i+a)/p]11q+j+b]//pq. pq. Therefore," should read --[(i+a)q+[i+a)/p]//q+j+b]//pq. Therefore,--;

Col. 8, line 18, "[(1+a)/p]//q=(i/p)//q," should read --[(i+a)/p]//q=(i/p)//q,--;

Col. 8, line 19, "aq+b=[M(i+a,j+b)-iq-(i/p)//q-j]//pq=(k-iq-λ" should read --aq+b[M(i+a,j+b)-iq-(i/p)//q-j]//pq=(k-iq---;

Col. 8, line 22, "1(i,j,k,t)=A(i+a,j+b)=λ" should read --1(i,j,k,t)=A(i+a,j+b)=---;

Col. 8, line 56, "b=[k-iq-λ" should read --b=[k-iq---;

Col. 9, line 3, "]-1+[(k-j)/q]11p)//pq=g(i,j,k,t)." should read --]-i+[(i-j)/q]//p)//pq=g(i,j,k,t).--;

Col. 9, line 12, "D(aq+b)" should read --d(aq+b)--;

UNITED STATES PATENT OFFICE
CERTIFICATE OF CORRECTION

Patent No. 3,996,559          Dated December 7, 1976

Inventor(s) Thomas Harvey Morrin and David Curtis Van Voorhis

It is certified that error appears in the above-identified patent and that said Letters Patent are hereby corrected as shown below:

Page 3 of 3 continued -

Col. 10, line 66, "m=($\overline{t01}$[i0.q+x011q]+j//pq)//pq." should read --m=($\overline{t01}$[i0.q+x0//q]+j//pq)//pq.--;

Col. 11, line 7, "$\overline{t01}$", first occurrence, should read --t01--, and in the same line "t01", second occurrence, should read --$\overline{t01}$--;

Col. 11, line 57, "1u=1" should read --1u2=1--;

Col. 11, line 63, "eu2=EQ(z=i0,0)=EQ(i z,i0)" should read --eu2=EQ(z-i0,0)=EQ(z,i0)--;

Col. 12, line 34, "1v2=LI([v-$\overline{t01}$(x0//q)]//q,j0)." should read --1v2=LT([v-$\overline{t01}$(x0//q)]//q,j0).--;

Col. 14, line 35 "01" should read --t01--;

Col. 18, line 9, "1(i,j,k,t)=[(i+g(i,j,k,t))/p]s+j/p," should read --1(i,j,k,t)=[(i+g(i,j,k,t))/p]s+j/q,--.

Signed and Sealed this

Nineteenth Day of April 1977

[SEAL]

*Attest:*

RUTH C. MASON
*Attesting Officer*

C. MARSHALL DANN
*Commissioner of Patents and Trademarks*